United States Patent
Chamayou et al.

(10) Patent No.: US 8,314,197 B2
(45) Date of Patent: Nov. 20, 2012

(54) PROCESS FOR THE DEGASSING OF POLYMER POWER

(75) Inventors: Jean-Louis Chamayou, Carry le Rouet (FR); Daniel Marissal, Carry le Rouet (FR)

(73) Assignee: Ineos Europe Limited, Hampshire (GB)

( * ) Notice: Subject to any disclaimer, the term of this patent is extended or adjusted under 35 U.S.C. 154(b) by 107 days.

(21) Appl. No.: 12/737,910

(22) PCT Filed: Sep. 21, 2009

(86) PCT No.: PCT/EP2009/062195
§ 371 (c)(1),
(2), (4) Date: Feb. 28, 2011

(87) PCT Pub. No.: WO2010/037656
PCT Pub. Date: Apr. 8, 2010

(65) Prior Publication Data
US 2011/0160420 A1 Jun. 30, 2011

(30) Foreign Application Priority Data
Oct. 3, 2008 (EP) .................................... 08165813

(51) Int. Cl.
C08F 210/00 (2006.01)
C08F 10/14 (2006.01)
C08F 110/14 (2006.01)
C08F 10/04 (2006.01)
(52) U.S. Cl. .................. 526/348; 526/348.2; 526/348.3; 526/348.4; 526/348.5; 526/348.6
(58) Field of Classification Search .................. 526/348, 526/348.3, 348.6, 348.2, 348.4, 348.5
See application file for complete search history.

(56) References Cited

U.S. PATENT DOCUMENTS

| | | | |
|---|---|---|---|
| 372,758 A | 11/1887 | Naylor | |
| 4,372,758 A | 2/1983 | Bobst et al. | |
| 5,376,742 A | 12/1994 | Krause | |
| 5,789,501 A | 8/1998 | Chapman et al. | |

FOREIGN PATENT DOCUMENTS

| | | |
|---|---|---|
| EP | 0 127 253 A1 | 12/1984 |
| EP | 0 475 603 A1 | 3/1992 |
| EP | 0 596 434 A1 | 5/1994 |
| EP | 0 683 176 A1 | 11/1995 |
| EP | 0 855 411 A1 | 7/1998 |
| EP | 1 484 344 A2 | 12/2004 |
| WO | WO 02/088194 A1 | 11/2002 |
| WO | WO 03/011920 A1 | 2/2003 |
| WO | WO 2004/047959 A1 | 6/2004 |
| WO | WO 2005/003318 A2 | 1/2005 |
| WO | WO 2006/079774 A1 | 8/2006 |
| WO | WO 2008/015228 A2 | 2/2008 |
| WO | WO 2008/024517 A2 | 2/2008 |
| WO | WO 2008024517 A2 * | 2/2008 |

OTHER PUBLICATIONS

Landolt-Bornstein; "Vapor Pressure of Chemicals"; Group IV: Physical Chemistry, vol. 20, pp. 10-11, 15, 22 and 37 (1999).
CRC Handbook of Chemistry and Physics; 68$^{th}$ Edition; *CRC Press Inc.*, pp. D192, D198-D203, D211-D212, D214-D215 (1987-1988).
Stull, D.R.; "Vapor Pressure of Pure Substances Organic Compounds"; Industrial and Engineering Chemistry; vol. 39, No. 4, pp. 517-540 (1947).
Clark, J.; "An Introduction to Saturated Vapour Pressure"; http://www.chemguide.co.uk/physical/phaseeqia/vapourpress.html; pp. 1-7 (2004).

* cited by examiner

*Primary Examiner* — William Cheung
(74) *Attorney, Agent, or Firm* — Nixon & Vanderhye

(57) ABSTRACT

Process for producing a degassed polymer powder, by a) feeding i) a principal monomer, and ii) one or more comonomers in an amount of at least 5000 ppmw relative to the principal monomer feed rate, and iii) optionally an added alkane having 2 to 10 carbon atoms, fed in an amount of at least 1000 ppmw relative to the principal monomer feed rate; into a polymerization reactor. The monomer and comonomers react to form a polymer including residual hydrocarbons having one or more hydrocarbons with 3 to 10 carbon atoms, and b) passing the polymer to a degassing step where it is contacted with a purge gas to remove some of the residual hydrocarbons.

24 Claims, No Drawings

PROCESS FOR THE DEGASSING OF POLYMER POWER

This application is the U.S. national phase of International Application No. PCT/EP2009/062195 filed 21 Sep. 2009 which designated the U.S. and claims priority to European Application No. 08165813.0 filed 3 Oct. 2008, the entire contents of each of which are hereby incorporated by reference.

The present invention relates to processes useful for the production of polymer powder, and in particular to processes for the degassing of polymer powder.

The production of polymer powder by polymerisation reactions of monomers in the presence of catalysts is well-known. For example, processes are known and widely operated commercially using both fluidised bed reactors and slurry phase reactors.

In the gas fluidised bed polymerisation of olefins, for example, the polymerisation is conducted in a fluidised bed reactor wherein a bed of polymer particles is maintained in a fluidised state by means of an ascending gas stream comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

In a slurry polymerisation process the polymerisation is conducted in a stirred tank or, preferably, a continuous loop reactor comprising mainly polyolefin, inert solvent (diluent) and a catalyst for the polymerisation. Polymer product is removed from the reactor in the form of a slurry of the reaction diluent.

The polymer product removed from the reactor may contain unreacted monomers and other hydrocarbon species (for example, hydrogen, ethane, methane, propane, pentane, hexane, butane) and these monomers and other hydrocarbons should be removed from the polymer product since failure to do so may lead to (a) hydrocarbons levels rising to explosive levels in downstream equipment or (b) environmental constraints being exceeded or (c) unacceptable product quality e.g. odours.

One step that is typically used to remove entrained monomers and other residual hydrocarbons is to contact the produced polymer with a gas in a purge vessel, usually a counter-currently flowing inert gas, such as nitrogen. The said step may be referred to as "purging" or "degassing".

There are a number of prior art patents which describe methods for the removal of such hydrocarbons from the products of gas phase and slurry processes including such a step, such as U.S. Pat. No. 4,372,758, EP 127253, EP 683176, EP 596434, U.S. Pat. No. 5,376,742 and WO 2005/003318.

U.S. Pat. No. 4,372,758, for example, describes a degassing process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers may then be mixed with an inert gas stream which is often passed to a flare for disposal or vented to the atmosphere.

EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone.

A number of factors affect the rate at which the residual monomers and other components that might be present are removed. U.S. Pat. No. 4,372,758 describes a number of these, including temperature and pressure in the purge vessel, resin particle size and morphology, monomer concentration in the resin, purge gas composition (monomer content) and purge gas flow rate, but there are also others. These factors determine the required residence time in the purge vessel in order for the residual monomer level in the polymer to be reduced to safe levels prior to further downstream treatment, but although the requirements can be determined experimentally or by past process experience for any particular polymer, the relationships are generally complex.

In general, despite the above, it is still difficult to remove all residual hydrocarbons in an economic manner. Thus, whilst purge gas rates, purge gas purity (residual level of hydrocarbons present), temperature and residence times in the degassing step may all, in theory, be increased to give complete hydrocarbon removal for any particular polymer, the costs associated with such steps mean that it is typical for small amounts of hydrocarbons to remain in the polymer even after degassing; downstream product storage silos are normally purged to prevent accumulation of desorbed hydrocarbon vapours from the stored polymer.

Further, in operation of a commercial polymerisation process it is typical to produce a sequence of different polymers by variation of reaction conditions, such as temperature or comonomer used with time, this being a so-called "polymerisation campaign". Although degassing designs may be well optimised for some polymer products that might be made, degassing processes are often inflexible in operation for degassing of other polymer products, with more or less reliance made on the subsequent storage purge to deal with the residual hydrocarbons rather than variation in degassing conditions.

More recently, WO 2008/024517 has described a method and apparatus for managing volatile organic content of polyolefins. In this disclosure a purge column model is described which is based on mass transfer theory, and which is used to control the degassing process such that the purge rates may be varied dependent on the polymer to be degassed.

However, it has been found that models based on mass transfer theory do not accurately represent the degassing process. In particular, it has been found experimentally that the actual diffusion rates between the solid and the gas phases are not the same as used for a mass transfer model as described in WO 2008/024517, which reduces the accuracy of such models. Further, it has been found that a more accurate representation of the degassing process may be obtained based on equilibrium parameters, and in particular based on the absorption coefficient, Kh, for the polymer powder to be degassed, which itself can be determined experimentally, thus meaning that the degassing process may be modelled or operated based on representative experimentally derived parameters.

Further, the Kh value has been found, for a particular polymer powder, to be almost independent of the system temperature, T, and of the hydrocarbon studied over the range of interest for a large majority of certain polymerisation reactions. Because of this, a degassing process may be accurately and safely controlled based on Kh and the identity of a herein defined "critical hydrocarbon component", which is based on the heaviest component fed to the reaction mixture from which the polymer to be degassed is formed and being selected from the principal monomer, one or more comonomers and, where present, one or more added alkanes.

Thus, the present invention seeks to provide improved degassing processes in which the conditions are determined or controlled based on the polymer to be degassed such that the residual hydrocarbon content in the final degassed polymer is reduced below a particular, low, level, regardless of the polymer being degassed.

Thus, in a first aspect, the present invention provides a process for the production of a degassed polymer powder, which process comprises:

a) feeding;
  i) a principal monomer, and
  ii) one or more comonomers fed in an amount of at least 5000 parts per million by weight (ppmw) relative to the principal monomer feed rate, and
  iii) optionally one or more added alkanes having 2 to 10 carbon atoms, fed in an amount of at least 1000 parts per million by weight (ppmw) relative to the principal monomer feed rate;
  into a polymerisation reactor wherein the monomer and comonomers react to form a polymer comprising residual hydrocarbons comprising one or more hydrocarbons having 3 to 10 carbon atoms, and
b) passing the polymer to a degassing step wherein it is contacted with a purge gas to remove at least some of the residual hydrocarbons,
characterised in that:
  1) the G/P ratio in the degassing step is higher than a minimum G/P ratio, G being the purge gas mass flow rate in the degassing step and P being the polymer throughput of the degassing step, and
  2) the purge gas has a concentration of critical hydrocarbon component which is lower than a maximum concentration of said critical hydrocarbon component in the purge gas, the critical hydrocarbon component being the heaviest hydrocarbon component selected from (i), (ii) and (iii) fed in step (a);
which minimum G/P ratio and maximum concentration of said critical hydrocarbon component in the purge gas have been calculated based on the absorption coefficient, Kh, for the polymer powder to be degassed.

Kh is the absorption coefficient for the polymer powder to be degassed. Kh is an experimentally derived parameter based on the relationship between vapour partial pressure and absorbed hydrocarbon concentration on a polymer powder. The value of Kh may be measured experimentally for a particular polymer powder by exposing a sample of a polymer powder at constant temperature, T, e.g. 80° C., and a measured pressure to a hydrocarbon e.g. pentane, and measuring the amount of absorbed hydrocarbon versus pressure. The measurement of hydrocarbon absorbed may be made using standard equipment, such as a Sarthorius balance. The measured percentage by weight of absorbed hydrocarbon on the powder is then plotted versus partial pressure of the hydrocarbon/Psat(T), where Psat(T) is the hydrocarbon saturated vapour pressure above liquid at the temperature T of the measurement. The gradient of this line at low values of the partial pressure of the hydrocarbon/Psat(T) (i.e. less than 0.4) is the value Kh. (The hydrocarbon saturated vapour pressure above a liquid is a well known thermodynamic property which varies for a given component only with the temperature, T. Values for Psat(T) can be readily found in the literature.)

As noted above, it has been found that, for a particular polymer powder, the Kh constant is almost independent of the system temperature, T, and of the hydrocarbon studied over the range of interest for the present invention. Thus, the value obtained using the above for a particular polymer powder may be used for other hydrocarbons and for other system temperatures within the ranges of interest (residual hydrocarbon: C3-C10, typical temperature in degassing step: 50-110° C.).

Kh does vary, however, with the polymer properties and therefore does depend inter alia on melt index and density. For example, approximately, the Kh varies with density of polyethylene as follows:

| Density range | Kh value expected to be within range |
|---|---|
| 950-970 | 1-3 |
| 935-950 | 2-5 |
| 925-935 | 4-8 |
| 916-925 | 6-13 |
| 910-916 | 8-17 |

It is not always necessary to measure an accurate value experimentally. Often the value of Kh may be determined with considerable accuracy from tables or databases of Kh values for other products.

In the present invention, both the minimum G/P ratio and the maximum concentration of said critical hydrocarbon component in the purge gas have been calculated based on the absorption coefficient, Kh.

In the present invention, both the minimum G/P ratio and the maximum concentration of said critical hydrocarbon component in the purge gas are also dependent on the critical hydrocarbon component.

In the present invention this is defined as the heaviest hydrocarbon component fed to the polymerisation reactor to form the polymer to be degassed selected from
  i) principal monomer,
  ii) one or more comonomers fed in an amount of at least 5000 ppmw relative to the principal monomer feed rate, and
  iii) where used, one or more added alkanes having 2 to 10 carbon atoms, fed in an amount of at least 1000 ppmw relative to the principal monomer feed rate.

In all aspects of the present invention, preferably the critical hydrocarbon component has at least 4 carbon atoms. The critical hydrocarbon component preferably has 10 or less carbon atoms, and most preferably has 4 to 8 carbon atoms.

For avoidance of doubt, "heaviest" means having the highest molecular weight from those defined. Where two compounds of the same molecular weight are present e.g. hydrocarbon isomers, they are considered as a single component for the determination of the critical hydrocarbon component.

For avoidance of doubt, "added alkanes" refers to alkanes specifically added to the reaction mixture, for example, as inert diluents or condensable inert hydrocarbons. As defined, this does not include alkanes that may be formed in-situ in the polymerisation process. Alkanes formed in-situ would also, in general, be expected to be present in amounts lower than 1000 ppmw.

In particular, in this first aspect of the present invention the minimum G/P ratio can be equated to $1.25*X$, where $X=28/Mw/100*Kh*Ptot/Psat(T)$ and the maximum concentration of said critical hydrocarbon component in the purge gas can be equated to Y, where $Y=100*(Psat(T)/Ptot/Kh)*Z$ wherein:

T is the polymer powder temperature at the bottom of the degassing step,

Mw and Psat(T) are, respectively, the molecular weight and the hydrocarbon saturated vapour pressure above liquid at the temperature T, of the critical hydrocarbon component, Ptot is the pressure in the degassing column, as measured above the powder to be degassed, and Z is the desired maximum residual hydrocarbon content of the critical component in the degassed polymer powder.

As used herein, Psat(T) and Ptot should be measured relative to absolute pressure e.g. psia or bara, but otherwise the units used are not especially critical since they cancel each other out. Similarly, G and P should both be measured in the same units, usually tonnes/hr or kg/hr.

Kh is dimensionless.

T is usually measured in degrees Celsius (° C.), although again this is not critical.

Z and Y are usually measured, respectively, in parts per million by weight (ppmw) and in parts per million by volume (ppmv)

Z is the desired maximum residual hydrocarbon content of the critical component in the degassed polymer powder. As used herein "residual hydrocarbons" are hydrocarbons that are absorbed on the polymer. Such components do not form part of the chemical structure of the polymer and are removable by degassing. Residual hydrocarbons will include alkanes, as well as comonomers and principle monomer that have not reacted in the polymerisation reaction. Typically, the polymer formed in step (a) comprises residual hydrocarbons in an amount of 0.2 to 25% by weight of the one or more hydrocarbons having 3 to 10 carbon atoms.

It has been found that, to a very accurate approximation and for most reactions, the heaviest component present in "significant" amounts and selected from the principal monomer, one or more comonomers and any alkanes present in step (a) is the most important component for determining the minimum G/P ratio and maximum concentration of said critical hydrocarbon component in the purge gas in the subsequent degassing to remove the residual hydrocarbons.

In particular, although heavier components, such as oligomers, may be formed in the polymerisation, they are usually at a low enough concentration or are not volatile enough to cause environmental, safety or product quality concerns.

Similarly, although it is possible that low levels of "heavier" components may be fed to the reactor other than what might be considered the "desired" components, for example as low levels of impurities in other feeds, such components are generally also at relatively low concentrations. In the present invention these need not be considered unless they are present (fed) in amounts above the defined thresholds (5000 ppmw for comonomers and 1000 ppmw for alkanes, relative to the principal monomer feed rate).

"Principal Monomer" as used herein is meant to refer to the monomer which is present in the largest amount in the polymerisation reaction.

"Comonomers" are monomers other than the principal monomer.

Both the principal monomer and the one or more comonomers will usually have 2 to 10 carbon atoms (with the proviso that the one or more comonomers have a different number of carbon atoms to the monomer).

The principal monomer is most preferably ethylene or propylene.

The comonomer is preferably an olefin (other than the principal monomer) having 2 to 10 carbon atoms. Thus, where propylene is the principal monomer, the co-monomer may be ethylene, or may be an olefin having 4 or more carbon atoms, whereas when ethylene is the principal monomer, the comonomer may be propylene or an olefin having 4 or more carbon atoms.

Preferably, the comonomer is an olefin having 4 to 10 carbon atoms.

Alkanes having 2 to 10 carbon atoms may be utilised in polymerisation reactions for a number of reasons. For example, alkanes having 2 to 10 carbon atoms may be used as diluents in slurry polymerisation processes or as inert components and/or condensable fluids in gas phase polymerisation processes.

Alkanes having at least 4 carbon atoms are preferably present, especially if both the principal monomer and the comonomer used have less than 4 carbon atoms. In this case, the critical hydrocarbon component must therefore have at least 4 carbon atoms.

Typically, in a gas phase polymerisation reaction the alkane will be present in the polymerisation reaction mixture in an amount of at least 1 wt %, more typically at least 10 wt %, of the total weight of the reaction composition. In contrast, in a typical slurry phase polymerisation reaction the alkane will be present in the polymerisation reaction mixture in an amount of at least 90 wt %, more typically at least 95 wt %, of the total weight of the reaction composition.

The G/P ratio is a known parameter in a degassing process, G being the stripping/purge gas flow rate (by mass) in the degassing step and P being the polymer throughput of the degassing step. The exact G/P ratio may vary within a degassing column. As used herein, therefore, the G/P ratio is as measured at the point of entry of the gas into the degassing step. Thus, G is the purge gas mass flow rate entering the degassing step and P is the polymer mass flow rate leaving the degassing step.

Both may be easily measured. For example, the purge gas mass flow rate can be measured using a suitable flow meter through which the purge gas is passed prior to the degassing step, and the polymer throughput can be measured based on the weight of polymer versus time exiting the degasser. (The polymer throughput can also accurately be determined from the amount of olefin fed to the reactor.)

In general, the upper limit of the G/P ratio is not critical. Nevertheless, using a ratio higher than is necessary results in a higher gas phase flow rate in the degassing step (for a fixed polymer throughput) and a higher recirculation requirement, usually with limited additional benefit in terms of hydrocarbon removal.

Similarly, the lower limit of the concentration of said critical hydrocarbon component in the purge gas is not critical, but whilst lower concentration (higher purge gas purity) is beneficial for hydrocarbon removal, there can be a significant cost penalty in providing a purge gas with a purity higher than necessary.

The concentration of critical hydrocarbon component in the purge gas may be measured by GC analysis of a sample of the purge gas.

Preferably, the G/P ratio in the degassing step is between 1.25*X and 10*X and the concentration of said critical hydrocarbon component in the purge gas is between 0.1*Y and Y.

Most preferably, the G/P ratio in the degassing step is between 1.25*X and 2.5*X, especially when the critical hydrocarbon component has 6 or more carbon atoms i.e. is relatively heavy. This range has been determined to be the optimum for removal of residual hydrocarbons to below the desired levels. Above the value of 2.5*X, limited additional benefit is obtained.

In particular, with regards to the G/P ratio, the most desirable upper limit has also been found to have some dependency on the critical hydrocarbon component. For example, for degassing of a polymer of ethylene as principal monomer and 1-butene as comonomer and critical hydrocarbon component, the value of X is generally relatively low, so the minimum G/P ratio required is also relatively low. Although it is still beneficial to operate with G/P slightly above, rather than significantly above, the required minimum, the penalty for significantly increasing the G/P ratio relative to X is relatively small, so a range of up to 10*X may be perfectly acceptable without significant economic penalty.

In contrast, when degassing of a polymer of ethylene as principal monomer and 1-hexene or 1-octene as comonomer and critical hydrocarbon component, the value of X is relatively large, and so the minimum G/P ratio required is relatively increased. Thus, the benefits of operation with G/P slightly above, rather than significantly above, the required minimum are more significant. Thus, when the critical hydrocarbon component has 6 or more carbon atoms a range of 1.25*X to 2.5*X is strongly preferred.

The minimum G/P ratio and maximum concentration of said critical hydrocarbon component in the purge gas may be calculated based on the absorption coefficient, Kh, for the polymer powder to be degassed by any suitable method. For example, a process model for the degassing step may be developed and used. Alternatively, a simple spreadsheet calculation can be used or a table of values of the minimum G/P ratio and maximum concentration of said critical hydrocarbon component in the purge gas which have been calculated previously can be used.

The temperature, T, in the degassing step is typically in the range 50-110° C. As used herein, any reference to temperature in or of a degassing step is defined as the polymer powder temperature measured at the polymer outlet of the degassing step. The temperature, T, may be measured using a suitable temperature probe located at the polymer outlet of the degassing step The temperature of purge gas is not critical but would typically be in the range of 0-100° C.

The pressure, Ptot, in the degassing step is typically in the range 1 to 2 bara (100 to 200 kPa). Ptot may be measured using a suitable pressure transmitter located in the degassing step.

Z is the desired maximum residual hydrocarbon content of the critical hydrocarbon component in the degassed polymer powder. The exact value of Z is derived by the person skilled in the art for a particular process and critical hydrocarbon component based on safety or environmental concerns related to downstream processing and storage. The exact value is not critical, and in fact may vary between different operators even for the same product depending on the particular safety and environmental thresholds adopted. Once the value of Z is chosen, the process of the present invention ensures that the resulting degassed polymer meets the required specification. Usually, Z is less than 1000 ppmw, preferably less than 500 ppmw, and most preferably less than 250 ppmw. The value is usually different for different residual hydrocarbons, with larger amounts generally being allowed for heavier components due to their lower volatility. For example, for 1-butene, Z is usually less than 100 ppmw, for 1-hexene, Z is usually less than 250 ppmw and for 1-octene, Z is usually less than 500 ppmw.

The residual hydrocarbon content of the critical hydrocarbon component in a polymer powder is suitably measured by multiple head space analysis of a sample of the polymer.

Head space analysis is a known technique for measuring the volatile components present in a sample. A number of commercially available analysis systems are available, for example Turbomatrix HS-40, available from Perkin Elmer Life and Analytical Sciences, Shelton, Conn., United States.

In the present invention, the residual hydrocarbon content has been measured on a Perkin Elmer Turbomatrix HS-40 with a 0.4 g sample held in a 22 ml sample vial maintained at 100° C., and equipped with a gas chromatograph (GC) with FID detector, for analysis of the extracted samples.

The sample in the vial is pressured to 20 psi with nitrogen carrier gas. The head space is then extracted and transferred to the gas chromatograph for analysis.

The process of pressurisation/extraction should be repeated 9 times (multiple head space extraction), and the results totalled for each component identified by the GC to provide the residual hydrocarbon content for each hydrocarbon component of interest.

The same technique may also be used for determining the residual hydrocarbon content on the polymer formed in step (a) prior to degassing. However, it is not always possible to obtain a sample directly from the reactor. Although accurate knowledge of the amount of residual hydrocarbons on the formed polymer in the reactor is not critical in the process of the present invention, such can also be determined if required from a graph of percentage by weight of absorbed hydrocarbon on a polymer powder plotted versus partial pressure of the hydrocarbon/Psat(T) determined as described previously for determination of Kh, combined with a knowledge of the reaction composition (in particular the partial pressures of relevant component(s)).

The process of the first aspect of the present invention relates generally to a process in which the polymer comprising residual hydrocarbons is subjected to only one degassing step which involves the contacting of said polymer with a purge gas ("purge step"). For avoidance of doubt, there may however be other steps in which hydrocarbons are removed from the polymer powder other than by contact with a purge gas, such as "flashing".

In general, operation according to the first aspect of the present invention has been found to provide improved degassing of such a polymer powder in a degassing process with a single purge step, based on the Kh and critical hydrocarbon component.

In another (second) aspect of the present invention, the use of degassing conditions based on Kh, itself based on the polymer powder to be degassed, and the critical hydrocarbon component has also allowed development of an improved two step degassing process.

Thus, in a second aspect of the present invention, there is provided an improved degassing process, based on control of the parameters described above, in which the residual hydrocarbon content of a polymer powder is reduced below a particular, low, level, using at least two degassing steps, wherein each involves contacting a polymer powder to be degassed with a purge gas i.e. using at least two purge steps. For avoidance of doubt, as with the first aspect, there may be other steps in which hydrocarbons are removed from the polymer powder other than by contact with a purge gas.

More particularly, the second aspect of the present invention provides a degassing process in which a polymer comprising residual hydrocarbons comprising one or more hydrocarbons having 3 to 10 carbon atoms is subjected to at least two stages which involve the contacting of said polymer powder with a purge gas, and wherein the conditions in these two stages of the degassing process are controlled based on the polymer being degassed and whilst optimising use of components of the residual hydrocarbons removed as at least a portion of the purge gas.

Thus, in a second aspect, the present invention provides a process for the production of a degassed polymer powder, which process comprises a) feeding;
   i) a principal monomer, and
   ii) one or more comonomers fed in an amount of at least 5000 parts per million by weight (ppmw) relative to the principal monomer feed rate, and
   iii) optionally one or more added alkanes having 2 to 10 carbon atoms, fed in an amount of at least 1000 parts per million by weight (ppmw) relative to the principal monomer feed rate;

into a polymerisation reactor wherein the monomer and comonomers react to form a polymer comprising residual hydrocarbons comprising one or more hydrocarbons having 3 to 10 carbon atoms;

b) passing the polymer to a first degassing step wherein, at a temperature, $T_1$ in range 50 to 110° C., it is contacted with a first purge gas to remove at least some of the residual hydrocarbons as a first gaseous phase and give a polymer with a reduced content of residual hydrocarbon, which is passed to a second degassing step, c) in a second degassing step, at a temperature, $T_2$, in the range 50 to 110° C., contacting the polymer removed from the first degassing step with a second purge gas to produce a degassed polymer powder with a concentration of critical hydrocarbon component less than $Z_1$ ppmw and a second gaseous phase, characterised in that:

1) the first gaseous phase from the first degassing step is treated to remove hydrocarbons having greater than 3 carbon atoms and leave a third gaseous phase comprising predominantly inert gas and hydrocarbons having 3 or less carbon atoms, at least a portion of which is recycled to the first degassing step as at least a portion of the first purge gas, 2) the G/P ratio in the first degassing step is greater than the G/P ratio in the second degassing step, and is between $1.25*X_1$ and $10*X_1$ where:

$X_1 = 28/Mw/100*Kh*Ptot1/Psat(T_1)$, 3) the concentration of the critical hydrocarbon component in parts per million by volume in the first purge gas is less than $Y_1$, where:

$Y_1 = 100*(Psat(T_1)/Ptot1/Kh)*2000$, and 4) the second purge gas is an inert gas and/or the concentration of the critical hydrocarbon component in parts per million by volume in the second purge gas is less than $Y_2$, where $Y_2 = 100*(Psat(T_2)/Ptot2/Kh)*Z_f$, wherein:

G is the purge gas mass flow rate in the respective degassing step,

P is the polymer throughput in the respective degassing step,

Kh is the absorption coefficient for the polymer powder to be degassed, the "critical hydrocarbon component" being the heaviest hydrocarbon component selected from (i), (ii) and (iii) fed in step (a), Mw, $Psat(T_1)$ and $Psat(T_2)$ are, respectively, the molecular weight, the hydrocarbon saturated vapour pressure above liquid at the temperature $T_1$, and the hydrocarbon saturated vapour pressure above liquid at the temperature $T_2$, all being of the critical hydrocarbon component, and Ptot1 and Ptot2 are, respectively, the total pressures in the first and second degassing steps, and with the proviso that where the critical hydrocarbon component has 6 or more carbon atoms, but there is also fed to the reaction of step (a) one or more components selected from (ii) and (iii) having 4 or 5 carbon atoms, then the second degassing step is operated such that I. the degassed polymer powder also has a concentration of the heaviest hydrocarbon component selected from the one or more components selected from (ii) and (iii) in step (a) having 4 or 5 carbon atoms of less than zf parts per million by weight, and II. that the second purge gas is an inert gas and/or the concentration of the heaviest hydrocarbon component selected from the one or more components selected from (ii) and (iii) in step (a) having 4 or 5 carbon atoms in the second purge gas is less than y2 (in parts per million by volume), where $y2 = 100*(psat(T_2)/Ptot2/Kh)*zf$, where $psat(T_2)$ is the hydrocarbon saturated vapour pressure above liquid at the temperature $T_2$, of the heaviest hydrocarbon component selected from the one or more components selected from (ii) and (iii) in step (a) having 4 or 5 carbon atoms.

The process of the second aspect of the present invention provides a polymer powder with a concentration of critical hydrocarbon component of less than $Z_f$ ppmw.

The value, $Z_f$, is usually selected by the operator of the process based on safety or environmental concerns related to downstream processing and storage, and usually is less than 1000 ppmw, and preferably less than 500 ppmw. The value is usually different for different residual hydrocarbons, with larger amounts generally being allowed for heavier components due to their lower volatility. For example, for 1-butene, $Z_f$ is usually less than 100 ppmw, for 1-hexene, $Z_f$ is usually less than 250 ppmw and for 1-octene, $Z_f$ is usually less than 500 ppmw.

More specifically, the first degassing step is particularly efficient at the removal of "heavier" hydrocarbons (which as used herein means having 6 of more carbon atoms) such as 1-octene, 1-hexene and hexane. The first degassing step operates with a relatively high flow rate of purge gas in such circumstances, but there is a lower requirement on the hydrocarbon concentration in the first purge gas. In contrast, for degassing of hydrocarbons such as 1-butene, a lower flow rate of purge gas but with a higher purity would normally be required. In the present invention, although a significant amount of such "lighter" hydrocarbons may still be removed in the first degassing step, as will heavier components that might be present, the final desired residual hydrocarbon content is achieved by the use of the second degassing step using a relatively pure second purge gas.

Whilst the two step degassing process of the second aspect of the present invention is flexible for degassing of polymers having "lighter" hydrocarbons or having "heavier" hydrocarbons, most advantageously, the two step degassing process can provide very efficient degassing of polymers comprising a mixture of "heavier" and "lighter" residual hydrocarbon components. By "lighter" residual hydrocarbon components is meant one or more residual hydrocarbon components having 5 or less carbon atoms. In contrast, by "heavier" residual hydrocarbon components is meant one or more residual hydrocarbon components having 6 or more carbon atoms.

In such systems with a combination of components e.g. pentane and 1-octene, the second aspect of the present invention is characterized in that the concentration of both the "heavier" and "lighter" components in the second purge gas is limited. Thus, where the critical hydrocarbon component has 6 or more carbon atoms e.g. 1-octene, but there is also fed to the reaction of step (a) significant amounts of one or more comonomers and/or one or more added alkanes having 4 to 5 carbon atoms, e.g. pentane, then the concentration of both the "heaviest" and the "lighter" components in the second purge gas is limited. This ensures that the total residual hydrocarbon concentration should be less than $Z_f$ based on 1-octene the heaviest component, but the pentane concentration in the final polymer should also be below its safety level.

The first degassing step provides a polymer with a reduced content of residual hydrocarbon. As with the first aspect, the polymer formed in step (a) typically comprises residual hydrocarbons in an amount of 0.2 to 25% by weight of the one or more hydrocarbons having 3 to 10 carbon atoms. Generally, the majority of the residual hydrocarbons in the polymer passed to the two degassing steps are removed in the first degassing step. Generally, the polymer exiting the first degassing step has a residual hydrocarbon content (measured as total residual hydrocarbons) of less than 2000 ppmw, and preferably less than 1000 ppmw.

The polymer with a reduced content of residual hydrocarbons exiting the first degassing step will typically have a concentration of the critical hydrocarbon component of less than 1000 ppmw.

In one embodiment, a desired maximum residual hydrocarbon content of the critical component in the polymer powder exiting the first degassing step, $Z_i$ may be selected by the operator based on the desired value $Z_f$. In this particular embodiment, the concentration of the critical hydrocarbon component in the first purge gas is less than $Y_1$, where:

$$Y_1=100*(Psat(T_1)Ptot1/Kh)*Z_i.$$

where $Z_i$ is the desired maximum residual hydrocarbon content of the critical component in the polymer powder exiting the first degassing step, $Z_i$ being less than 2000 ppmw. $Z_i$ is usually less than 1000 ppmw. To a reasonable approximation, a suitable value of $Z_i$ may be selected by the operator based on the value $Z_f$. Typically, $Z_i$ is up to 20 times higher than $Z_f$. More typically, for degassing of polymers having one or more residual hydrocarbon components having 4 or less carbon atoms as the heaviest component, a ratio of $Z_i$ to $Z_f$ of 10 to 20 is usually suitable. In contrast, for degassing of polymers having one or more residual hydrocarbon components having 5 or more carbon atoms as the heaviest component, a ratio of $Z_i$ to $Z_f$ of 5 to 10 is usually suitable whilst for degassing of polymers having one or more residual hydrocarbon components having 6 or more carbon atoms as the heaviest component a ratio of 1.1 to 5 is usually more suitable.

The preferred features of the second aspect are generally as for the first aspect.

Thus, the polymer powder is preferably a polyethylene or a polypropylene prepared by polymerising ethylene and/or propylene, most preferably with one or more C4 to C10 comonomers.

Further, the G/P ratio in the first degassing step is most preferably between 1.25*X and 2.5*X, especially when the critical hydrocarbon component has 6 or more carbon atoms i.e. is relatively heavy.

The relationship between $T_1$ and $T_2$ is not especially critical. In general, no specific heating (or cooling) is applied between the degassing steps, and thus $T_1$ and $T_2$ are usually similar, with $T_2$ being slightly lower than $T_1$ due to a small amount of cooling that occurs during the second degassing step on contact with the second purge gas.

Similarly for Ptot1 and Ptot2, the relationship between them is not especially critical. In general, Ptot1 and Ptot2 are usually similar, with slight differences being present only due to inherent pressure drop as purge gas and polymer powder pass through the degassing steps.

Step (a) of the first and second aspects of the present invention may, in addition to the reaction in which the polymer to be degassed is formed, comprise one or more product removal and intermediate treatment steps prior to the degassing step(s) of the present invention.

For example, in a gas phase polymerisation process, the polymer powder may be removed from the reactor in which it is formed and passed to a flash tank or other depressurisation step, wherein the pressure is reduced. This step, which may also be considered as a preliminary degassing step, usually results in the removal of the majority of gas phase hydrocarbons, as well as significant portions of any absorbed hydrocarbons. Significant portions of ethylene and/or propylene may be removed in this step, but lower portions of absorbed C4 to C10 hydrocarbons. Thus, the residual hydrocarbons which it is generally hardest to remove, and to which the present invention is most useful, are the C4 to C10 residual hydrocarbons.

In a typical Slurry process, reaction takes place in a loop reactor. Slurry is removed from the loop and depressurised at intermediate pressure. Heating may be applied to compensate for cooling of the powder by vaporisation of liquid hydrocarbons. Light components such as C2, C3 and most C4 components may again be degassed, but a significant amount of C4 and heavier components remain on the powder which may then be passed to the degassing steps of the present invention.

In the second aspect of the process of the present invention, the first degassing step usually results in the removal of the majority of the residual hydrocarbons in the polymer, and generally results in removal of any heavier hydrocarbons to close to or below an acceptable concentration in the polymer powder. However, whilst the majority of a component such as 1-butene would also be removed in the first degassing step, it is difficult to obtain the purity of the first purge gas required to reach acceptable downstream levels using a partially recycled purge gas.

(Obviously, pure nitrogen used as purge gas for the first degassing step, for example, would meet the purity requirement, but this would be costly to operate, especially when it is also desired to remove heavier hydrocarbons and hence requires a higher flow rate than would be required just for 1-butene removal.)

In the second aspect of the process of the present invention, the removal of lighter residual hydrocarbons is achieved by use of a second degassing step, downstream of the first, wherein the polymer removed from the first degassing step is contacted with a second purge gas.

Preferably the second purge gas is an inert gas, and most preferably it is nitrogen. Preferably, the second purge gas is a "fresh" or "pure" inert gas. By "fresh" is meant that said gas is not a recycle gas. Such streams are considered free of hydrocarbon components, at least for the purposes of the present invention.

The G/P ratio in the second degassing step is less than that in the first degassing step. In general, the G/P in the second degassing step is between 0.005 and 0.05, with higher values within this range being preferred for degassing of polymer powders having a heavier critical hydrocarbon component, although the variation required for heavier critical hydrocarbon components relative to lighter critical hydrocarbon components in the second degassing step is generally less than in the first degassing step.

Further, the G/P ratio in the second degassing step compared to the G/P ratio in the first degassing step generally reduces as the weight of the critical hydrocarbon component increases. Typically the G/P ratio in the first degassing step is between 1.1 and 10 times the G/P in the second degassing step. Higher values within this range are preferred as the weight of the critical hydrocarbon component increases.

In step (1) of the second aspect of the present invention, the first gaseous phase from the first degassing step is treated to remove hydrocarbons having greater than 3 carbon atoms and leave a third gaseous phase comprising predominantly inert gas and hydrocarbons having 3 or less carbon atoms, at least a portion of which is recycled to the first degassing step as at least a portion of the first purge gas.

In one embodiment, a portion of the third gaseous phase forms all of the first purge gas i.e. no other gas is added to it.

In a second embodiment, at least a portion of the second gaseous phase resulting from the second degassing step is used as a portion of the first purge gas in the first degassing step. In this embodiment, at least a portion or the third gaseous phase and at least a portion of the second gaseous phase are preferably combined to form the first purge gas.

This may be achieved by performing the first and second degassing steps in two separate columns, and mixing all or a portion of the second gaseous phase exiting the second degassing step with all or a portion of the third gaseous phase, prior to passing the mixed stream as the first purge gas to the first degassing step.

Alternatively, the first and second degassing steps may be performed in a single, combined, column. In this scenario, the column may be considered as having two separate sections for the first and second degassing steps, and at least a portion of the third gaseous stream is fed to the column at an intermediate stage between these two sections where it combines with the second gaseous phase in the column. In this scenario, the entire second gas phase is used as a portion of the first purge gas.

Gas purges may be taken from the process, e.g. from the third gaseous phase, to avoid build-up of inert hydrocarbons.

Some typical values are given below for polymerisation of ethylene with different comonomers as the critical hydrocarbon component, and are illustrated further in the Examples. These values derive from a process in which pure nitrogen is used as the second purge gas and in which the entire second gaseous phase removed from the second degassing step is passed to the first degassing step as a portion of the first purge gas. These examples show that, although the amount of the second purge gas required in the process of the present invention, and hence the G/P ratio in the second degassing step, tends to increase with increased weight of the critical hydrocarbon component, the proportion of the first purge gas which the second gaseous stream makes up tends to decrease with increased weight of the critical hydrocarbon component since the desired G/P ratio in the first degassing step also tends to increase with increased weight of the critical hydrocarbon component. This increased G/P ratio is obtained by having a larger total flow of the first purge gas, which results in an increased flow of the first gaseous stream, and a larger flow of the recycled third gaseous stream to the first purge gas.

It should be noted that these values are only provided as examples of the general trends between different critical hydrocarbon components, and the key requirements are still defined by the equations defined herein.

| Critical hydrocarbon component | 1-butene | 1-hexene | 1-octene |
|---|---|---|---|
| G/P in second degassing step | 0.008 | 0.02 | 0.04 |
| G/P in first degassing step | 0.010 | 0.05 | 0.30 |
| Critical hydrocarbon concentration in first purge gas | 52,000 ppmv | 3000 ppmv | 55 ppmv |

The first gaseous phase from the first degassing step may be treated to remove hydrocarbons having greater than 3 carbon atoms and leave a third gaseous phase comprising predominantly inert gas and hydrocarbons having 3 or less carbon atoms by any suitable technique. Examples are condensation, compression/refrigeration, hydrocarbon absorption on a fixed bed and membrane separation. A particularly preferred technique is the use of low pressure, low temperature separation using a low pressure blower and refrigeration separation.

As used herein, "low pressure" means a pressure of less than 4 bara, preferably in the range 1 to 4 bara, and a low pressure blower is defined as a device which circulates gas whilst generating a pressure differential below a 3.5 compression ratio.

As used herein, "low temperature" means a temperature of less than 0° C., preferably in the range −40° C. to 0° C., and a refrigeration system is defined as a system in which the inlet stream is cooled to produce an outlet stream at a temperature between 0 and −40° C. The hydrocarbons having greater than 3 carbon atoms removed by this process are removed as a liquid purge from this step.

Such processes have the advantage of using mechanical components (such as exchangers, blowers and pumps) unaffected by the presence of catalyst, cocatalyst and fines. On the contrary, process compressors, such as reciprocating compressors, have proven to be less reliable under such conditions.

This particular technique has a low pressure drop, which has the particular advantage that no compressor is required on the third gaseous phase prior to its use in the first degassing step (and any pressure differential can be made up from providing the second gaseous phase at a slightly higher pressure than the third gaseous phase)

Some or all of the removed hydrocarbons having greater than 3 carbon atoms may be recycled to the original polymerisation process, optionally with a purge to prevent build-up of hydrocarbons and inerts.

The product of the present invention may be passed directly to subsequent processing or to storage.

The first and second degassing steps of the second aspect may be performed in separate vessels, but are preferably performed in a single vessel ("a combined degasser"). Such a vessel would normally have a first degassing section located in an upper section, and polymer from the first degassing step would fall by gravity into the second degassing section located below.

The total residence time of the powder in the first and second degassing steps is typically between 0.5 and 3 hours.

Step (a) of the first and second aspects of the present invention may take place in any suitable reaction vessel.

Preferably, the reaction of step (a) is carried out is a gas phase reaction, and most preferably is carried out continuously in a gas phase fluidised-bed reactor. Such reactors and their operation are well-known, and examples include EP 0 475 603, EP 1 240 217, EP 1 484 344 and EP 0 855 411.

Two or more reaction vessels which are used sequentially to produce a polymer product may be present in a commercial polymerisation process. One example of such processes is the production of bimodal polyethylenes using two reactors operating under different conditions. In such scenarios, the reaction of step (a) of the present invention is the last reaction vessel in the sequence.

In fluidised bed processes, the particles of polymer being formed are maintained in the fluidised state by virtue of a reaction gas mixture containing the monomers to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled. One or more compounds may be injected into the reaction zone in liquid form. Vaporisation of the liquid in the reaction zone provides the effect of cooling directly in the reaction zone.

The polymerisation is suitably carried out in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The product polymer removed from the reaction vessel is passed to a degassing vessel wherein it is contacted with a purge gas to remove the residual hydrocarbons.

The degassing step or steps of the present invention may take place in any suitable degassing vessel or vessels. For example, the degassing vessel may consist of a "combined degasser" in which two or more degassing stages are present in a single degassing column. The contact of the purge gas and the polymer to be degassed usually takes place countercurrently, for example by passing purge gas to the base of a degassing vessel and polymer to be degassed to the top of said vessel so that they are contacted therein, and withdrawing the degassed polymer from the base and the purge gas from the top of the vessel.

The catalyst used in production of the polymer in step (a) may be any suitable catalyst. Examples of suitable catalysts that are known for polymerisation reactions include metallocene, Ziegler (or "Ziegler-Natta") and "Phillips" (or "chromium") catalysts, and mixtures thereof.

EXAMPLES

Comparative Example

Mass Transfer Model

Attempts to model degassing using a mass transfer model have been made. One problem with mass transfer models is that the diffusion coefficients they use can be rather difficult to obtain. However, a model was attempted based on the integration of the Fick's diffusion law.

The theory indicates that the diffusion, and therefore the degassing, will depend on the particle diameter. However both on an industrial plant and at lab scale this has not been observed.

1) Average particle size of a polymer product was increased by addition of an activity booster to a reaction on an industrial plant. The model based on mass transfer indicates that the larger particles will result in different diffusion, and without adjustment a different residual hydrocarbon content. However, no variation of the degassing performance was observed.

2) The global diffusion coefficient ($D/r^2$) has been measured for fines and for normal powder at laboratory scale. Again a model based on mass transfer indicates that the larger particles will result in different diffusion coefficients. However, in agreement with the results obtained industrially, and contrary to the expected results from the mass transfer model, the same value is observed for both the fines and the normal powder.

The above experimental results show that the actual diffusion rates between the solid and the gas phases are not the same as predicted using a mass transfer model, such as that described in WO 2008/024517. This reduces the usefulness of such models.

Example 1

Operation Based on Absorption Coefficient Kh

Degassing has been modelled using the absorption coefficient, Kh, to define the minimum G/P ratio and the maximum concentration of said critical hydrocarbon component in the purge gas.

The process comprises a two stage degassing in a single degassing column. In a first degassing step, the produced polymer is countercurrently contacted with a first purge gas at a pressure, $Ptot_1$, of 1.20 bara and a temperature, $T_1$, of 65° C., and in the second degassing step, the polymer is subsequently countercurrently contacted with pure nitrogen (as second purge gas) at a pressure, $Ptot_2$, of 1.25 bara and a temperature, $T_2$, of 65° C.

The first purge gas comprises the complete second gas phase (nitrogen plus degassed components from the second degassing step) exiting the second degassing step, combined with a portion of recycled gas obtained by taking the first gaseous phase exiting the first degassing step and treating said stream to remove hydrocarbons having greater than 3 carbon atoms therefrom.

Some typical values of the required flow rates and G/P ratios, along with gas purities are given below for polymerisation of ethylene with one or more comonomers, each of which form the critical hydrocarbon component in said Examples.

| Critical hydrocarbon component | 1-butene | 1-hexene | 1-octene |
|---|---|---|---|
| Polymer feed rate to first degassing step | 40 T/hr | 40 T/hr | 40 T/hr |
| Kh | 8 | 9 | 12 |
| X1 | 0.006 | 0.0282 | 0.2288 |
| First purge gas flow rate | 0.93 T/hr | 2.1 T/hr | 12.6 T/hr |
| G/P in first degassing step | 0.02 | 0.05 | 0.3 |

-continued

| Critical hydrocarbon component | 1-butene | 1-hexene | 1-octene |
|---|---|---|---|
| Y1 | 52584 ppmv | 5116 ppmv | 329 ppmv |
| Critical hydrocarbon concentration in first purge gas (ppmv) | 52544 ppmv | 3417 ppmv | 55 ppmv |
| Residual critical hydrocarbon content after first degassing step | 634 ppmw | 434 ppmw | 301 ppmw (+420 ppmw C5) |
| N2 flow rate as second purge gas | 0.6 T/hr | 0.8 T/hr | 1.5 T/hr |
| G/P in second degassing step | 0.015 | 0.02 | 0.04 |
| Residual critical hydrocarbon content after second degassing step | 36 ppmw | 183 ppmw | 256 ppmw (+38 ppmw C5) |

It can be seen from the above that when degassing a polymer comprising 1-butene the second degassing step is critical in order to obtain a low residual hydrocarbon content in the degassed polymer. With 1-hexene a lower residual hydrocarbon content is obtained from the first degassing step, although the second degassing step still serves to significantly further reduce the residual hydrocarbon content.

For the polymer comprising a mixture and pentane and 1-octene the first degassing step provides good removal of the 1-octene component, and the second degassing step reduces the level of pentane further.

The invention claimed is:

1. A process for the production of a degassed polymer powder, which process comprises
   a) feeding
   i) a principal monomer, and
   ii) one or more comonomers fed in an amount of at least 5000 ppmw relative to the principal monomer feed rate, and
   iii) optionally one or more added alkanes having 2 to 10 carbon atoms, fed in an amount of at least 1000 ppmw relative to the principal monomer feed rate;
   into a polymerisation reactor wherein the monomer and comonomers react to form a polymer comprising residual hydrocarbons comprising one or more hydrocarbons having 3 to 10 carbon atoms, and
   b) passing the polymer to a degassing step wherein it is contacted with a purge gas to remove at least some of the residual hydrocarbons, wherein:
   1) the G/P ratio in the degassing step is higher than a minimum G/P ratio, G being the purge gas mass flow rate in the degassing step and P being the polymer throughput of the degassing step, and
   2) the purge gas has a concentration of critical hydrocarbon component which is lower than a maximum concentration of said critical hydrocarbon component in the purge gas, the critical hydrocarbon component being the heaviest hydrocarbon component selected from (i), (ii) and (iii) fed in step (a),
   which minimum G/P ratio and maximum concentration of said critical hydrocarbon component in the purge gas have been calculated based on the absorption coefficient, Kh, for the polymer powder to be degassed, and wherein the minimum G/P ratio is $1.25*X$, where $X=28/Mw/100*Kh*Ptot/Psat(T)$ and the maximum concentration of said critical hydrocarbon component in the purge gas is Y, where $Y=100*(Psat(T)/Ptot/Kh)*Z$
   where:
   T is the polymer powder temperature at the polymer exit of the degassing step,
   Mw and Psat(T) are, respectively, the molecular weight and the hydrocarbon saturated vapour pressure above liquid at the temperature T, of the critical hydrocarbon component,
   Ptot is the pressure measured above the powder to be degassed in the degassing column, and
   Z is the desired maximum residual hydrocarbon content of the critical component in the degassed polymer powder.

2. A process as claimed in claim 1, wherein the polymer formed in step (a) comprises residual hydrocarbons in an amount of 0.2 to 25% by weight of said one or more hydrocarbons having 3 to 10 carbon atoms.

3. A process as claimed in claim 1, wherein the G/P ratio in the degassing step is between $1.25*X$ and $10*X$ and the concentration of said critical hydrocarbon component in the purge gas is between $0.1*Y$ and Y.

4. A process as claimed in claim 3, wherein the G/P ratio in the degassing step is between $1.25*X$ and $2.5*X$.

5. A process as claimed in claim 1 wherein the polymer powder temperature, T, in the degassing step is in the range 50-110° C.

6. A process as claimed in claim 1 wherein the pressure, Ptot, in the degassing step is in the range 100 to 200 kPa.

7. A process for the production of a degassed polymer powder, which process comprises
   a) feeding;
   i) a principal monomer, and
   ii) one or more comonomers fed in an amount of at least 5000 parts per million by weight (ppmw) relative to the principal monomer feed rate, and
   iii) optionally one or more added alkanes having 2 to 10 carbon atoms, fed in an amount of at least 1000 parts per million by weight (ppmw) relative to the principal monomer feed rate;
   into a polymerisation reactor wherein the monomer and comonomers react to form a polymer comprising residual hydrocarbons comprising one or more hydrocarbons having 3 to 10 carbon atoms
   b) passing the polymer to a first degassing step wherein, at a temperature, $T_1$ in range 50 to 110° C., it is contacted with a first purge gas to remove at least some of the residual hydrocarbons as a first gaseous phase and give a polymer with a reduced content of residual hydrocarbon, which is passed to a second degassing step,
   c) in a second degassing step, at a temperature, $T_2$, in the range 50 to 110° C., contacting the polymer removed from the first degassing step with a second purge gas to produce a degassed polymer powder with a concentration of critical hydrocarbon component less than $Z_f$ ppmw and a second gaseous phase, wherein:
   1) the first gaseous phase from the first degassing step is treated to remove hydrocarbons having greater than 3 carbon atoms and leave a third gaseous phase comprising predominantly inert gas and hydrocarbons having 3 or less carbon atoms, at least a portion of which is recycled to the first degassing step as at least a portion of the first purge gas,
   2) the G/P ratio in the first degassing step is greater than the G/P ratio in the second degassing step, and is between $1.25*X_i$ and $10*X_i$ where:

$X_1=28/Mw/100*Kh*Ptot1/Psat(T_1)$, 3) the concentration of the critical hydrocarbon component in parts per million by weight in the first purge gas is less than $Y_1$, where:

$Y_1=100*(Psat(T_1)/Ptot1/Kh)*2000$, and 4) the second purge gas is an inert gas and/or the concentration of the critical hydrocarbon component in parts per million by volume in the second purge gas is less than $Y_2$, where $Y_2=100*(Psat(T_2)/Ptot2/Kh)*Z_f$, wherein:

G is the purge gas mass flow rate in the respective degassing step,

P is the polymer throughput in the respective degassing step,

Kh is the absorption coefficient for the polymer powder to be degassed, the "critical hydrocarbon component" being the heaviest hydrocarbon component selected from (i), (ii) and (iii) fed in step (a), Mw, $Psat(T_1)$ and $Psat(T_2)$ are, respectively, the molecular weight, the hydrocarbon saturated vapour pressure above liquid at the temperature $T_1$, and the hydrocarbon saturated vapour pressure above liquid at the temperature $T_2$, all being of the critical hydrocarbon component, and Ptot1 and Ptot2 are, respectively, the total pressures in the first and second degassing steps, and with the proviso that where the critical hydrocarbon component has 6 or more carbon atoms, but there is also fed to the reaction of step (a) one or more components selected from (ii) and (iii) having 4 or 5 carbon atoms, then the second degassing step is operated such that I. the degassed polymer powder also has a concentration of the heaviest hydrocarbon component selected from the one or more components selected from (ii) and (iii) in step (a) having 4 or 5 carbon atoms of less than zf ppmw, and II. the second purge gas is fresh inert gas or the concentration of the heaviest hydrocarbon component selected from the one or more components selected from (ii) and (iii) in step (a) having 4 or 5 carbon atoms in the second purge gas is less than y2, where $y2=100*(psat(T_2)/Ptot2/Kh)*zf,$ where $psat(T_2)$ is the hydrocarbon saturated vapour pressure above liquid at the temperature $T_2$, of the heaviest hydrocarbon component selected from the one or more components selected from (ii) and (iii) in step (a) having 4 or 5 carbon atoms.

8. A process as claimed in claim 7, wherein the polymer formed in step (a) comprises residual hydrocarbons in an amount of 0.2 to 25% by weight of said one or more hydrocarbons having 3 to 10 carbon atoms.

9. A process as claimed in claim 7, wherein the G/P ratio in the first degassing step is between 1.25*X and 2.5*X.

10. A process as claimed in claim 7, wherein the G/P ratio in the first degassing step is between 1.1 and 10 times the G/P in the second degassing step.

11. A process according to claim 7 wherein step (a) comprises one or more product removal and intermediate treatment steps prior to the degassing step(s) of the present invention.

12. A process according to claim 11, wherein the polymer powder is removed from a reactor in which it is formed and passed to a flash tank or other depressurisation step, wherein the pressure is reduced to remove gaseous hydrocarbons.

13. A process according to claim 7 wherein the second purge gas is fresh inert gas.

14. A process as claimed in claim 7 wherein the first gaseous phase from the first degassing step is treated to remove hydrocarbons having greater than 3 carbon atoms and leave a third gaseous phase comprising predominantly inert gas and hydrocarbons having 3 or less carbon atoms by the use of separation at a temperature of −40° C. to 0° C. and a pressure of 1 to 4 bara using a low pressure blower and refrigeration separation.

15. A process as claimed in claim 1 wherein the principal monomer is ethylene or propylene.

16. A process as claimed in claim 1 wherein the comonomer is an olefin having 2 to 10 carbon atoms.

17. A process according to claim 14 wherein the polymer powder is a polyethylene or a polypropylene prepared by polymerising ethylene and/or propylene with one or more C4 to C10 comonomers.

18. A process as claimed in claim 1 wherein the comonomer is selected from 1-hexene and 1-octene.

19. A process as claimed in claim 7 wherein the principal monomer is ethylene or propylene.

20. A process as claimed in claim 7 wherein the comonomer is an olefin having 2 to 10 carbon atoms.

21. A process as claimed in claim 7 wherein the comonomer is selected from 1-hexene and 1-octene.

22. A process according to claim 13 wherein the second purge gas is nitrogen.

23. A process as claimed in claim 16 wherein the comonomer is an olefin having 4 to 10 carbon atoms.

24. A process as claimed in claim 20 wherein the comonomer is an olefin having 4 to 10 carbon atoms.

* * * * *